United States Patent [19]
Vogler et al.

[11] Patent Number: 6,056,933
[45] Date of Patent: May 2, 2000

[54] INVERSION CARBON BLACKS AND METHOD FOR THEIR MANUFACTURE

[75] Inventors: Conny Vogler, Bornheim-Sechtem; Karl Vogel, Alzenau; Werner Niedermeier, Brühl; Burkhard Freund, Erfstadt; Paul Messer, Brühl, all of Germany

[73] Assignee: Degussa-Hüls Aktiengesellschaft, Frankfurt, Germany

[21] Appl. No.: 09/160,143

[22] Filed: Sep. 25, 1998

[30] Foreign Application Priority Data

Apr. 9, 1998 [DE] Germany .............................. 198 16 025

[51] Int. Cl.⁷ ................................ C01D 3/00; C08K 3/00
[52] U.S. Cl. ....................... 423/449.1; 524/495; 524/496
[58] Field of Search ......................... 423/449.1; 524/495, 524/496

[56] References Cited

U.S. PATENT DOCUMENTS 5,320,826  6/1994  Yoshii et al. ........................ 423/449.1
5,393,821  2/1995  Shiel et al. ........................... 423/449.1

*Primary Examiner*—Edward J. Cain

[57] ABSTRACT

Inversion carbon blacks and a method for their manufacture and disclosed. The inversion carbon blacks have a smaller rolling resistance with identical or improved wet sliding behavior. The particle size distribution contains a smaller proportion of particles with large diameters. This leads to an improved abrasion behavior of rubber compounds which were prepared using these carbon blacks. The inversion carbon blacks can be manufactured in conventional carbon black reactors by controlling the combustion in the combustion chamber in such a manner that carbon black nuclei form, which are immediately brought into contact with the carbon black raw material. The carbon blacks present a lower proportion of larger particles if the additions of combustion air and carbon black raw material are increased in an appropriate manner.

4 Claims, 7 Drawing Sheets

INVERSION CARBON BLACKS AND METHOD FOR THEIR MANUFACTURE

INTRODUCTION AND BACKGROUND

The present invention relates to improved inversion carbon blacks as well as a method for their manufacture.

Carbon blacks are used extensively as reinforcement carbon blacks in rubber compounds used in the tire industry. The properties of carbon blacks in this context have an influence, together with the properties of the rubber compounds used, on the performance properties of the completed tires.

The required properties are high abrasion resistance, low rolling resistance, and good adhesion in the case of wet road conditions. The two last properties are influenced essentially by the viscoelastic behavior of the tread compound. In the case of periodic deformation, the viscoelastic behavior can be described by the mechanical loss factor tan $\delta$, and in the case of elongation or compression, the viscoelastic behavior can be described by the dynamic elongation modulus $|E^*|$. Both magnitudes of these values are strongly temperature dependent. The adhesion to wet roads is, in this context, directly correlated with the loss factor tan $\delta_0$ at approximately 0° C., and the rolling resistance with the loss factor tan $\delta_{60}$ at approximately 60° C. The higher the loss factor is at low temperature, the better the adhesion of the tire composition to a wet road usually is. To reduce the rolling resistance, in contrast, a loss factor which is as small as possible at high temperature is required.

The abrasion resistance and the viscoelastic properties, and thus also the loss factor of the tread compounds, are essentially determined by the properties of the reinforcement carbon blacks used. Here, the essential parameter is the specific surface area, particularly the CTAB surface area, which is a measure of the rubber active surface area portion of the carbon black. As the CTAB surface area increases, the abrasion resistance and tan $\delta$ increase.

Other important carbon black parameters are the DBP absorption and the 24M4-DBP absorption as measured numbers for the starting structure, respecting the residual structure which still remains after mechanically stressing the carbon black, as well as the specific surface area (BET-surface area) of the carbon black as determined according to DIN 66132.

The identified carbon black parameters are dependent on the form of the carbon black particles. In the course of carbon black preparation, there is formed first the so-called primary particles with a diameter of 10 to 500 nm, which then grow into solid three dimensional aggregates. The spatial structure and the particle size distribution as parameters to be measured are exhibited in the precipitation.

For tread compounds, the suitable carbon blacks present a CTAB surface area of 20–190 m$^2$/g and 24M4-DBP absorption values of 40–140 mL/100 g.

The average particle diameter of the carbon black aggregate is used for the classification of the carbon blacks according to ASTM D-1765. This classification consists of a four-digit alphanumerical nomenclature, where the first letter (an N or an S) provides information regarding the vulcanization properties, and the first number of the subsequent three-digit number provides information regarding the average particle size. However, this ASTM classification is very rough. Thus, within one ASTM classification range, considerably deviating viscoelastic properties of the tread compounds can occur.

DE 19 521 565 describes inversion carbon blacks which to a large extent satisfy the requirements of low rolling resistance and improved adhesion. These are carbon blacks for which the ratio tan $\delta_0$/tan $\delta_{60}$ during incorporation into an SSBR/BR rubber compound satisfies the relation tan $\delta_0$/tan $\delta_{60}$>2.76–6.7×10$^{-3}$×CTAB, and the value of tan $\delta_{60}$ is always lower than the corresponding value for ASTM carbon blacks with identical CTAB surface area and 24M4-DBP absorption.

The carbon blacks according to DE 19 521 565 are manufactured according to the furnace carbon black method, which is used today to produce the overwhelming majority of the carbon blacks used in the tire industry. These methods were specially modified for the manufacture of the inversion carbon blacks.

The furnace carbon black method is based on the principle of oxidative pyrolysis; that is, the incomplete combustion of carbon black raw materials in a reactor which is coated with a highly fire-resistant material. As the carbon black raw material, so-called carbon black oils are used, but gaseous hydrocarbons can also be used alone or simultaneously with carbon black oil. Independently of the special construction design of the reactors, three zones can be distinguished in the carbon black reactor, which correspond to the different steps of the carbon black production. The zones are present successively along the reactor axis, and the reaction medium flows through them in succession.

The first zone, the so-called combustion zone, essentially comprises the combustion chamber of the reactor. Here a hot combustion chamber exhaust gas is generated, by burning a fuel, as a rule a hydrocarbon fuel, with an excess of preheated combustion air or other oxygen-containing gases. Natural gas is predominately used today as the fuel, but it is also possible to use liquid hydrocarbons such as heating oils. The combustion of the fuel usually occurs under conditions with an excess of oxygen. According to the book "Carbon Black" second edition, Marcel Dekker Inc., New York, 1993, page 20, it is very important, for the purpose of obtaining optimal use of the energy, that the conversion of the fuel to carbon dioxide and water occurs as completely as possible in the combustion chamber. In this process, the excess air promotes the complete conversion of the fuel. The fuel is usually introduced by means of one or more combustion lances into the combustion chamber.

The K factor is frequently used as an index number to characterize the excess air. The K factor is the ratio of the quantity of air required for the stoichiometric combustion of the fuel to the quantity of air which is in fact fed to the combustion. A K factor of 1 thus means that the combustion is stoichiometric. If there is an excess of air, the K factor is smaller than 1. Usually K factors of 0.3–0.9 are used.

In the second zone of the carbon black reactor, called the reaction zone, carbon black formation takes place. For this purpose, the carbon black raw material is injected and admixed in the hot waste gas stream. With respect to the oxygen quantity which is not completely reacted in the combustion zone, there is an excess hydrocarbon quantity introduced into the reaction zone. Therefore, under normal conditions, carbon black formation starts here.

Carbon black oil can be injected into the reactor in different manners. For example, an axial oil injection lance, or one or more radial oil lances which are arranged on the circumference of the reactor, in a plane which is vertical with respect to the direction of flow, are suitable. A reactor can have several planes with radial oil lances, along the direction of flow. At the tip of the oil lances, either spray or injection nozzles are provided, by means of which the carbon black oil is admixed in the waste gas stream.

In the case of simultaneous use of carbon black oil and gaseous hydrocarbons, such as, for example, methane, as the carbon black raw material, the gaseous hydrocarbons can be injected separately from the carbon black oil through a special set of gas lances into the hot waste gas stream.

In the third zone of the carbon black reactor, called the termination zone (quenching zone), carbon black formation is stopped by a rapid cooling of the carbon black-containing process gas. This process prevents any undesired secondary reactions. Such secondary reactions would lead to porous carbon blacks. The reaction is usually stopped by spraying in water using appropriate spray nozzles. Usually there are several points along the carbon black reactor for water spraying, for example, for "quenching" so that the residence time of the carbon black in the reaction zone can be varied. In an in-line heat exchanger, the residual heat of the process gas is used to preheat the combustion air.

A multitude of different reactor forms has become known. The different variants concern all three reactor zones, but a particularly high number of embodiment variants exist for the reaction zone and the arrangement of injector lances for the carbon black raw material. Modern reactors usually have several oil injection lances, distributed around the circumference of the reactor and also along the reactor axis. The carbon black oil quantity, distributed over several individual streams, can be better admixed in the stream of hot combustion waste gases flowing out of the combustion chamber. By means of introduction points distributed spatially in the direction of the flow, it is possible to stagger the oil injection over time.

The primary particle size, and thus also the normally easily determinable specific carbon black surface area, can be controlled by the quantity of carbon black oil injected into the hot waste gas. When the quantities and the temperatures of the waste gases generated in the combustion chamber are kept constant, the quantity of carbon black oil alone is responsible for the primary particle size, which relates to the specific carbon black surface area. Larger quantities of carbon black oil lead to coarser carbon blacks with lower specific surface areas than smaller quantities of carbon black oil. Simultaneously with a change in the quantity of carbon black oil, there is a change in the reaction temperature; since the sprayed carbon black oil lowers the temperature in the reactor, larger quantities of carbon black oil mean lower temperatures, and vice versa. From this it is possible to derive the relationship between the carbon black formation temperature and the specific carbon black surface area, in relation to primary particle size, which was described in the book "Carbon Black" cited above, on page 34.

If the carbon black oil is distributed from two different injection points, which are separately located along the reactor axis, then, in the first upstream location, the quantity of residual oxygen still contained in the combustion chamber waste gas is still in excess with respect to the sprayed carbon black oil. Thus, carbon black formation occurs at this point with a higher temperature compared to the subsequent carbon black injection points, that is, in the first injection point, the formed carbon blacks have finer particles, and present a higher specific surface area, than at a subsequent injection point. Each additional injection of carbon black oils leads to additional temperature drops and to carbon blacks with larger primary particles. Carbon blacks prepared in this manner thus present a widening of the particle size distribution curve and, after incorporation in a rubber, they present a different behavior than carbon blacks with a very narrow monomodular particle size spectrum. The wider particle size distribution curve leads to a lower loss factor of the rubber compound, that is to a low-hysteresis, and therefore the expression low-hysteresis (lh) carbon blacks is used. Carbon blacks of this type, or methods for their manufacture, have been described in the European Patents EP 0,315,442 and EP 0,519,988.

The conventional methods are thus able to produce, by means of the spraying devices for carbon black oil positioned at intervals along the reactor axis, carbon blacks with a wider particle size distribution curve, which impart a lower rolling resistance to rubber compounds in which they have been incorporated.

For the manufacture of the inversion carbon blacks, the furnace carbon black method was modified in another manner. Whereas the conventional furnace carbon black methods are intended to obtain as complete as possible a combustion of the fuels in the combustion chamber, more particularly in the combustion zone, the method according to DE 195 21 565 for the manufacture of inversion carbon blacks is based on the formation of hydrocarbon nuclei as a result of the incomplete combustion of the fuel in the combustion zone. The nuclei are then transported with the hot waste gas stream into the reaction zone, where a nucleation-induced carbon black formation is initiated with the added carbon black raw material. The intended incomplete combustion of the fuel, however, does not mean that the fuel is burned in a less than stoichiometric amount of oxygen. Rather, the method according to this invention also starts with an excess of air or oxygen-containing gases in the combustion chamber. As with conventional carbon blacks, K-factors of 0.3–0.9 can be used in this process.

In order to generate carbon black nuclei in spite of the excess air, different routes can be engaged according to DE 195 21 565. In a preferred variant of the method, liquid hydrocarbons are used as the starting fuel, which are then burned instead of natural gas in the combustion chamber of the reactor with an excess of air or oxygen-containing gases. Liquid hydrocarbons burn more slowly than gaseous hydrocarbons, because they first must be converted into the gaseous form, that is they must be vaporized. In spite of an excess of oxygen, liquid hydrocarbons can therefore be not only burned, but also used for the production of hydrocarbon nuclei which—if sufficient time is available and the temperature is sufficiently high—also burn, or they can grow to form larger carbon black particles if a rapid cooling is applied. The nucleation induced carbon black formation is based on the fact that the nuclei which are formed during the combustion of liquid hydrocarbons with an excess of oxygen are immediately brought in contact with the carbon black oil, and thus nucleus growth is initiated.

An additional variant of the method according to DE 195 21 565 uses natural gas as the fuel. Nucleation is achieved by selecting an outflow rate for the gas out of the combustion lance(s) which is so low that a poor admixture of the natural gas in the hot stream of combustion air is intentionally achieved. It is known that carbon black nuclei form in cases of poorly mixed flames, and the term luminous flames is used because of the lighting up of the particles which form. In this procedure, as in the combustion of liquid hydrocarbons, it is important for the formed nucleus to be brought into contact, immediately with their formation, with the carbon black oil. If one uses a larger combustion chamber, or combustion zone, to effect the conversion of the nuclei with the oxygen present in excess in the combustion zone, one thereby allows a complete combustion in the combustion zone of the carbon black reactor, and thus no nucleation-induced carbon black formation occurs.

Both described variants can also be combined. In that case, the liquid hydrocarbons and the natural gas, or other gaseous components, are simultaneously fed in appropriate ratios into the combustion zone. It is preferred to use oils, for example, the carbon black oil itself, as the liquid hydrocarbon.

The method according to DE 195 21 565 thus resides in using liquid and/or gaseous hydrocarbons as fuels in the combustion zone, in which the oxygen, with respect to the hydrocarbons used, is present in excess. This ensures that carbon black nuclei are formed, for example, due to the insufficient residence time of the liquid hydrocarbons or due to an insufficient mixing of the gaseous hydrocarbons with the combustion air. These carbon black nuclei are then brought into contact in the reaction zone, immediately after their formation, with the carbon black raw material, which is used in excess with respect to the quantity of oxygen. Cooling of the resulting carbon black reaction gas mixture follows by the introduction through nozzles of water into the termination zone, and the further processing of the carbon black so formed in the usual manner.

According to DE 195 21 565 the fuel plays an important role in carbon black formation; it is referred to as the primary carbon black raw material below. The carbon black raw material which must be admixed in the reaction zone is accordingly referred to as the secondary carbon black raw material, and, in terms of quantity, it accounts for the majority of the carbon black which forms.

The inversion carbon blacks according to DE 195 21 565 impart to the carbon black mixtures, compared to conventional carbon blacks, a reduced rolling resistance and a comparable adhesion under wet conditions. Furthermore, ATM (atomic force microscopy) examinations revealed that the inversion carbon blacks present a significantly rougher surface than the corresponding standard ASTM carbon blacks, which results in an improved binding of the rubber polymers to the carbon black particles (see W. Gronski et al., "NMR Relaxation, A Method Relevant for Technical Properties of Carbon Black-Filled Rubbers, International rubber conference 1997, Nuremberg, page 107). The improved binding of the rubber polymer leads to a reduction in the rolling resistance.

Examinations concerning the abrasion of rubber compounds using inversion carbon blacks have shown that these carbon blacks impart to the rubber compounds an improved abrasion resistance with lower exposure to loads. In the case of high loads, for example, in trucks tires, these rubber compounds present an increased abrasion.

An object of the present invention, therefore, is to provide improved inversion carbon blacks which are characterized particularly by a reduced abrasion under high loads.

SUMMARY OF THE INVENTION

The above and other objects of the present invention are achieved by a furnace carbon black with CTAB values of 20–190 $m^2/g$ and 24M4-DBP absorptions of 40–140 mL/100 g, with a ratio $\tan \delta_0/\tan \delta_{60}$ which, during incorporation in an SSBR/BR rubber compound, satisfies the relation $$\tan \delta_0/\tan \delta_{60} > 2.76 - 6.7 \times 10^{-3} \times CTAB,$$

where the value of $\tan \delta_{60}$ is always lower than the value for ASTM carbon blacks with the same CTAB surface area and 24M4-DBP absorption. This carbon black is characterized in that the distribution curve of the particle diameter sizes of the carbon black aggregate has an absolute slope of less than 400,000 $nm^3$.

A further feature of the invention resides in the method of producing the above furnace carbon blacks, as described herein below.

BRIEF DESCRIPTION OF DRAWINGS

The present invention will be further understood with reference to the drawings, wherein.

DETAILED DESCRIPTION OF INVENTION

Figure 1:
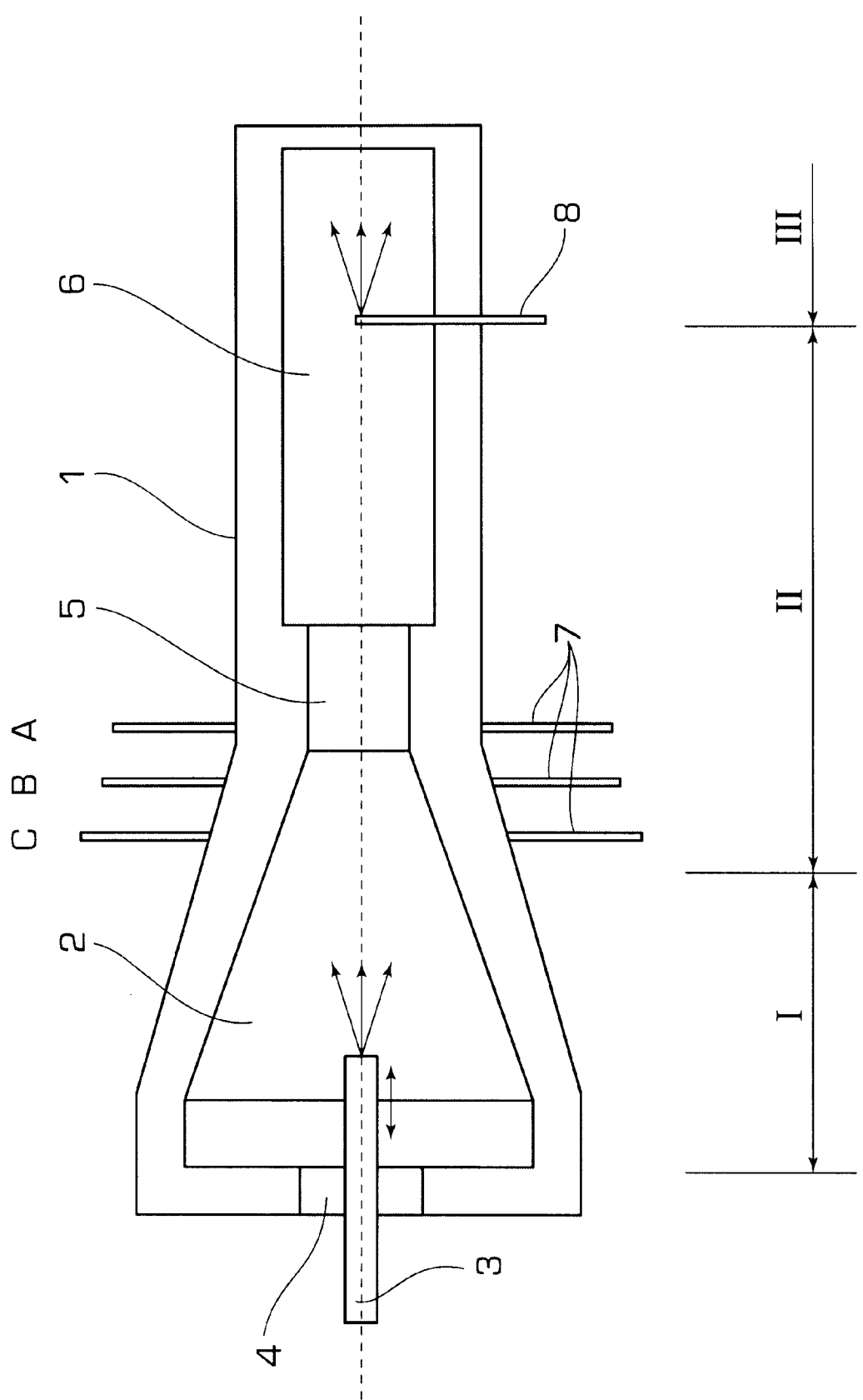
FIG. 1 is a schematic longitudinal section through the reactor used for the manufacture of the carbon blacks according to the invention.

The carbon blacks according to the invention satisfy, as far as the ratio $\tan \delta_0/\tan \delta_{60}$ goes, the same requirements as the mentioned inversion carbon blacks, and, therefore, when incorporated into rubber compounds, they impart a reduced rolling resistance to the resulting tires. However, compared to the known inversion carbon blacks, they are characterized by a narrower particle size distribution. For the description of the particle size distribution the measure of "absolute slope" used in statistics is used here (see: Lothar Sachs: Statistical Evaluation Methods," (in German) Springer-Verlag, Berlin, $3^{rd}$ edition, pages 81–83). It represents a description which is appropriate for the present problem, describing the shape of the particle size distribution curve as a range of particle sizes limited by maximum and minimum values.

The "absolute slope" is defined as the deviation from a symmetrical particle size distribution. A slanted distribution curve exists when one of the two descending branches of the distribution curve is elongated. If the left curve portion is elongated, this is referred to as a negative slope, that is, the determination of the absolute slope determines values of less than zero. If the right curve section is elongated, the slope is positive, with values larger than zero. The known ASTM carbon blacks, as well as the inversion carbon blacks, and the carbon blacks according to the invention, present varying degrees of positive slopes.

It was unexpectedly discovered that the accepted conception, in the state of the art, that a wider particle size distribution of the reinforcement carbon black imparts a reduced rolling resistance to the rubber compounds is not generally valid. The improvement of the rolling resistance of rubber compounds with inversion carbon blacks is apparently not only dependent on the widths of the particle size distribution, but, instead, it is essentially determined by the larger surface roughness of the inversion carbon blacks and the associated better binding of the rubber polymer to the carbon black surface.

Compared to known inversion carbon blacks with a relatively wide particle size distribution, it has now become possible to improve their abrasion resistance according to the invention by limiting the widths of the particle distribution. In particular, the proportion of carbon black particles with large particle diameters must be reduced, if the carbon blacks are to impart to the rubber compounds an improved abrasion resistance, simultaneously with a reduced rolling resistance. This is the case when the absolute slope of the particle size distribution is smaller than 400,000, preferably smaller than 200,000, nm³. The absolute slope of the inversion carbon blacks known from DE 195 21 565 is higher than 400,000 nm³, whereas the absolute slope of standard ASTM carbon blacks is less than 100,000 nm³.

The absolute slope of the particle size distribution of carbon black can be determined by means of a disk centrifuge and a corresponding evaluation of the measured values. The carbon black sample to be examined is in this process dispersed in an aqueous solution and separated in a disk centrifuge according to particle size; the larger the particles are, the greater is also their weight, and thus the carbon black particles move more rapidly as a result of centrifugal force in the aqueous solution towards the outside. In this process, they pass through a light barrier, by means of which the extinction is recorded as a function of time. From these data, the particle size distribution, that is the frequency as a function of particle diameter, is calculated. Then the absolute slope AS can be determined as follows:

$$AS = \frac{\sum_{i=1}^{k} H_i (x_i - \overline{x})^3}{\sum_{i=1}^{k} H_i}$$

In the formula $H_i$ denotes the frequency at which the particle diameter $x_i$ occurs and $\overline{x}$ is the particle diameter of the particles whose weight corresponds to the average particle weight of the carbon black aggregate. Also, $\overline{x}$ is calculated using the particle size distribution. The summations of the above formula must be carried out in the range from 1 nm to 3000 nm in equidistant spacing for each nanometer. Any missing measurement values are estimated by linear interpolation.

The inversion carbon blacks according to the invention can be manufactured according to the generic method described in DE 195 21 565 corresponding to U.S. application Ser. No. 08/665,632 which are both relied on and incorporated herein by reference. According to this method, the inversion carbon black is manufactured in a carbon black reactor, which contains, along the reactor axis, a combustion zone, a reaction zone and a termination zone. In the combustion zone, a stream of hot waste gases is generated by the combustion of a primary carbon black raw material in oxygen-containing gases. This hot gas stream is led from the combustion zone through the reaction zone into the termination zone. In the reaction zone, a secondary carbon black raw material is admixed with the hot waste gas. The carbon black formation is terminated in the termination zone by spraying with water. In this process, oil, an oil/natural gas mixture or natural gas alone is used as the carbon black raw material. The combustion of the primary carbon black raw material in the combustion zone is managed in such a manner that carbon black nuclei form, with which the secondary carbon black raw material is immediately brought into contact.

To obtain the carbon blacks according to the invention, this method must be implemented in such a manner that the carbon black which is forming has a particle size distribution with an absolute slope of less than 400,000 nm³. This can be achieved, for example, by increasing the addition of combustion air, primary and secondary carbon black raw material.

The described method is not limited to a certain reactor geometry. Rather, it can be adapted to different reactor types and reactor sizes. The desired nucleus formation in the combustion zone can be regulated by a person skilled in the art using different measures. Possible parameters for optimizing the nucleation in the case of the use of oil as a fuel are the combustion air/oil ratio by weight, the type of atomizer used for the fuel, and the size of the atomized oil droplet. As combustion atomizers it is possible to use pure pressure atomizers (single-substance atomizers) or two-substance atomizers with internal or external mixing, where pressurized air, steam, hydrogen, an inert gas or a hydrocarbon gas can be used as the atomization medium. The above-described combination of a liquid fuel and a gaseous fuel can thus be implemented, for example, by using the gaseous fuel as the atomization medium for the liquid fuel.

It is preferred to use two-substance atomizers for the atomization of liquid fuel. Whereas, in single-step substance atomizers, a change in the flow rate leads to a change in the droplet size, in the case of two-substance atomizers, the particle size can be influenced largely independently of the flow rate.

The size of the atomized droplets must be regulated in such a manner that at the site of the injection of the carbon black oil a sufficient number of carbon black nuclei is still available. The optimal droplet size depends on the geometry of the selected reactor. In the reactor used in the example, average droplet diameters of 50–100 μm have proven effective. These values were determined using the atomization of water. The optimal regulation of the atomizers however is best carried out empirically at the reactor by observation of the appearance of the flame. An excessively fine atomization of the liquid fuel leads to complete combustion of the droplet without nucleation. Excessively large droplets lead to choking and to an unstable flame. A slightly sooty flame leads to good nucleation.

The so-called carbon black oils; that is, the high aromatic and/or long-chain oils, can be used alone or in combination with hydrocarbon-containing gases, particularly natural gas, as the carbon black raw material. Suitable carbon black oils are petrochemical oils (steam cracker oils, cat cracker oils), carbochemical oils (hard coal oil) and pyrolysis oils with a BMC index of over 130. These oils are also atomized, as in the case of liquid fuels, preferably using two-substance atomizers.

By the method according to the invention, the entire range of industrial furnace carbon blacks can be manufactured. Persons skilled in the art are aware of the measures required for this method, such as, for example, the regulation of the residence time in the reaction zone and the addition of additives to influence the carbon black structure. It was discovered that the carbon blacks prepared by the method according to the invention differ significantly from conventional carbon blacks using the same characteristics of carbon black analysis. In the incorporation in SSBR/BR rubber compounds, these carbon blacks impart to the resulting rubber compound a tan $\delta_0$/tan $\delta_{60}$ ratio which is larger than that obtained with conventional carbon blacks, while, simultaneously, having a tan $\delta_{60}$ value which is less than a corresponding value for ASTM carbon blacks with the same CTAB surface area and 24M4-DBP absorption. This observation applies to carbon blacks with CTAB values between 20 and 190 m²/g, particularly to carbon blacks with CTAB values between 60 and 140 m²/g, and 24M4-DBP absorption values of 40 and 140 mL/100 g. In addition, with these carbon blacks, an appropriate control of the process method can be used to prevent the particle size distribution curve from containing particularly large proportions with large particle diameters.

The carbon blacks according to the invention impart to the SSBR/BR rubber compounds a stronger dependency of tan δ on temperature. In addition to this effect, called inversion in DE 195 21 565, the carbon blacks according to the invention present a narrowed particle size distribution compared to the conventional inversion carbon blacks. The dynamic elongation modulus |E*| of the SSBR/BR rubber compound with the carbon blacks according to the invention is as a rule lower, at 0° C., than the elongation modulus associated with the use of standard ASTM carbon blacks.

The nucleus-induced carbon black formation has, as in the case of the known inversion carbon blacks, an effect on the structuring of the surface of the carbon black particles. Examinations by atomic force microscopy (AFM) have shown that the carbon blacks according to the invention present a rougher surface than the standard ASTM carbon blacks.

The invention will now be further explained with reference to the following examples.

EXAMPLES 1 AND 2

In the carbon black reactor represented in FIG. 1, a conventional inversion carbon black (Example 1) and an inversion carbon black according to the invention (Example 2) were manufactured.

The carbon black reactor 1 has a combustion chamber 2, in which the hot waste gas is generated for the pyrolysis of the carbon black oil by the combustion of the primary carbon black raw material with the addition of oxygen from air. The primary carbon black raw material is introduced through the axial burner lance 3 into the combustion chamber 2. The burner lance 3 can be shifted in the axial direction to optimize the nucleus-induced carbon black formation.

The addition of the combustion air occurs through the opening 4 in the front wall of the combustion chamber 2. The combustion chamber narrows conically toward the narrow section 5. After the reaction gas mixture has passed the narrow section, it expands in the reaction chamber 6.

A, B and C designate different positions for the injection of the carbon black oil into the hot process gas by means of the oil lances 7. The oil lances, at their tips, have appropriate spray nozzles. Four injectors are distributed over the circumference of the reactor at each injection point.

The combustion zone, reaction zone and termination zone, which are of importance for the method according to the invention, are identified in FIG. 1 using Roman numerals I–III, respectively. They cannot be sharply distinguished from each other. Their axial extension depends from the given positioning of the burner lance, the oil lances and the quenching water lance 8.

The dimensions of the reactor used can be obtained from the following list:

| | |
|---|---|
| Largest diameter of the combustion chamber: | 900 mm |
| Length of the combustion chamber to the narrowed section: | 1390 mm |
| Length of the conical part of the combustion chamber: | 1160 mm |
| Diameter of the narrowed section: | 140 mm |
| Length of the narrowed section: | 230 mm |
| Diameter of the reaction chamber: | 250 mm |
| Position of the oil lances[1] | |
| A: | 110 mm |
| B: | −150 mm |
| C: | −320 mm |
| Position of the quenching water Lance(s)[1] | ≈ 1000 + 5500 mm |

[1] Measured from the entry into the narrowed section (+: after entry; −: before entry)

The two carbon blacks manufactured in the described reactor were pelletized using the conventional procedures, prior to their characterization and incorporation into the rubber compounds.

For the manufacture of the carbon blacks, a carbon black oil was used, as primary and as secondary carbon black raw materials, which has a BMC index of 160, and the properties listed in Table I.

TABLE I

| Properties of the carbon black oil | |
|---|---|
| Property | Content |
| Carbon content (wt %) | 93.4 |
| Hydrogen content (wt %) | 5.9 |
| Sulfur content (wt %) | 0.6 |
| Distillate quantity up to 275° C. (vol %) | 7.5 |
| Distillate quantity up to 300° C. (vol %) | 17.2 |
| Distillate quantity up to 400° C. (vol %) | 83.9 |
| Distilled components (vol %) | 97.9 |

The reactor parameters for the manufacture of the carbon blacks are listed in Table II.

Table II.1 Reactor parameter for the manufacture of the carbon blacks of Example 1 (comparison carbon black) and Example 2

| Reactor parameters | | Examples | |
|---|---|---|---|
| Parameter | Unit | 1 | 2 |
| Combustion Air | Nm³/h | 2500 | 3500 |
| Temperature of the combustion air | ° C. | 500 | 500 |
| Fuel (carbon black oil) | l/h | 200 | 240 |
| Position of the burner lance | mm | −1300 | −1300 |
| Carbon black oil | l/h | 590 | 860 |
| Carbon black oil temperature | ° C. | 110 | 120 |
| Natural gas | Nm³/h | — | — |

-continued

| Reactor parameters | | Examples | |
|---|---|---|---|
| Parameter | Unit | 1 | 2 |
| Position of the carbon black oil injectors | | 4 × A | 4 × A |
| Additive (K$_2$CO$_3$-solution) | 1/h × g/l | 15 × 1 | 9.5 × 3 |
| Quench position | mm | 1095 | |
| Temperature at the reactor outlet | ° C. | 750 | |

Determination of the characteristics of carbon black analysis:

In the carbon blacks according to the invention, and in several commercial comparison carbon blacks, the standard characteristics for carbon black analysis were determined according to the following standards:

| | |
|---|---|
| CTAB surface area: | ASTM D-3765 |
| Iodine adsorption: | ASTM D-1510 |
| DBP absorption: | ASTM D-2414 |
| 24M4-DBP absorption: | ASTM D-3493 |
| BET-surface area | DIN 66132 |

Determination of the viscoelastic properties:

The determination of the viscoelastic properties of the rubber compounds reinforced with these carbon blacks was carried out according to DIN 53513. In particular the loss factors tan δ at 0° C. and at 60° C., as well as the dynamic elongation modulus |E*| at 0° C. were determined. The test formulation used for the rubber compounds is listed in Table III.

TABLE III

SSBR/BR test formulation

| Rubber components | Content (phr) |
|---|---|
| SSBR | 96.0 |
| BR | 30.0 |
| Carbon Black | 80.0 |
| ZnO RS | 3.0 |
| Stearic Acid | 2.0 |
| Aromatic Oil | 10.0 |
| 6 PPD | 1.5 |
| Wax | 1.0 |
| CBS | 1.5 |
| Sulfur | 1.5 |

The SSBR rubber component is an SBR copolymer which is polymerized in solution and which has a styrene content of 25 wt % and a butadiene content of 75 wt %. The vinyl content of the butadiene is 67%. The copolymer contains 37.5 phr oil, and it is marketed under the commercial name of Buna VSL 5025-1 by Bayer AG. Its Mooney viscosity (ML 1+4/100° C.) was approximately 50.

The BR rubber component is a cis-1,4-polybutadiene (Neodym type) with a cis-1,4 content of 97 wt %, a trans-1,4 content of 2 wt %, a 1,2-content of 1 wt %, and a Mooney viscosity of 38–48. These components are marketed under the commercial name of Buna CB 24 Bayer AG.

As the aromatic oil, Naftolen ZD from Chemetall was used. The PPD portion of the test formulation was Vulkanox 4020 and the CBS portion was Vulkacit CZ, both from Bayer AG. As the wax, the product known as Protector G35 from HB-Fuller GmbH was used.

The incorporation of the carbon blacks in the rubber compound was carried out in three steps, according to the following list in table form:

| Step 1 | |
|---|---|
| Settings | |
| Mixing Apparatus | Werner & Pfleiderer GK 1.5 N |
| Friction | 1:1.11 |
| Rpm | 70 min$^{-1}$ |
| Ram pressure | 5.5 bar |
| Empty volume | 1.6 L |
| Filler Content | 0.73 |
| Flow Temperature | 80° C. |
| Mixing Process | |
| 0–1 min | Buna VSL 5025-1 + Buna CB 24 |
| 1–2 min | ½ carbon black + ZnO RS + stearic acid + |
| 2–3 min | ½ carbon black + Vulkanox 4020 + Protector G35 + Naftolen ZD |
| 3 min | Cleaning |
| 3–4.5 min | Mixing |
| 4.5 min | Cleaning |
| 4.5–6 min. | Mixing and Completion |
| Batch temperature | 140–160° C. |
| Storage | 24 h at room temperature |

| Step 2 | |
|---|---|
| Settings | |
| Mixing Apparatus | As in step 1, except 0.68 |
| Filling Content | 0.71 |
| Speed | 90 min$^{-1}$ |
| Flow through temp. | 90° C. |
| Mixing Process | |
| 0–2 min | Open batch from step 1 |
| 2 min–5 min | Batch temperature held at 165° C. by varying speed |
| 5 min | Completion |
| Batch temperature | 165° C. |
| Storage | 4 hr. at room temp. |

| Step 3 | |
|---|---|
| Settings | |
| Mixing Apparatus | As in step 1, except 0.65 |
| Filling Content | 0.69 |
| Speed | 40 min$^{-1}$ |
| Flow through temp. | 50° C. |
| Mixing Process | |
| 0–2 min | Batch from step 2 + Vulkacit CZ + sulfur |
| 2 min | Complete mixing and form a film on the laboratory mixing roller setup (Diameter 200 mm, length 450 mm, flow temperature 50° C.). Then, for homogenization: Cut 3 times on the left and 3 times on the right, and fold |

-continued

Step 3 over, and drop 8 times through narrow roller gap (1 mm) and 3 times with wide roll gap (3.5 mm), and then draw out the film.

The subsequent determination of the viscoelastic properties was carried out, in each case, with five test bodies made of the above rubber compounds, under the following conditions:

Table IV. Determination of the viscoelastic properties according to DIN 53513

| Vulcanization of the test bodies | |
|---|---|
| Vulcanization temperature | 165° C. |
| Vulcanization duration | $T_{95}$ + 3 min ($T_{95}$: DIN 53529) |
| Test body shape | |
| Shape | Cylindrical |
| Length | 10 mm |
| Diameter | 10 mm |
| Number | 5 |
| Test Machine | |
| Type/manufacturer | 830/MTS |
| Type of Load | Compression |
| Average force amplitude | 50 N |
| Dynamic force amplitude | ±25 N |
| Test frequency | 16 Hz |
| Test regimen | Temper for 5 min, then dynamic load application at 16 Hz for the duration of 2 min with subsequent measurement |

In each case, the average of the measurements performed on the five test bodies is used. The results of the viscoelastic examination are listed in Table V and graphically represented in FIG. 2. Overall, 14 commercial comparison carbon blacks, designated C1–C14 in Table V, and the carbon blacks of Examples 1 and 2, were examined.

Table V contains also, to the extent known, the ASTM classification of the comparison carbon blacks.

Figure 2:
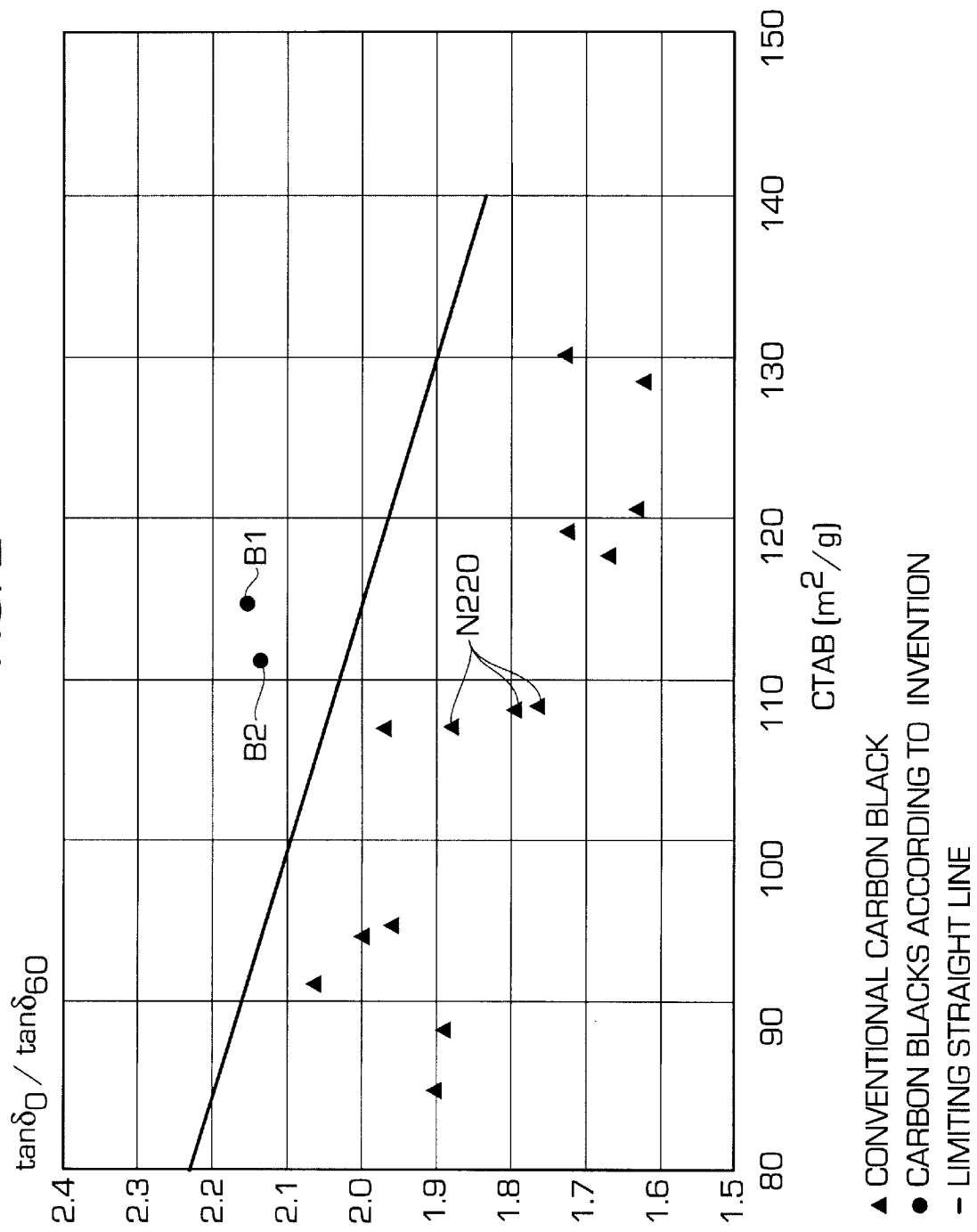
FIG. 2 is a diagram of the ratio $\tan \delta_0/\tan \delta_{60}$ above the CTAB surface area for different carbon blacks according to the invention and conventional comparison carbon blacks.

In Table V, the carbon blacks are ordered by increasing CTAB surface area. In FIG. 2, the ratio tan $\delta_0$/tan $\delta_{60}$ is provided above the CTAB surface area for these carbon blacks. The two inversion carbon blacks, with identical CTAB surface area, have a clearly larger tan δ ratio, that is, a steeper temperature profile of the loss factor. This also applies particularly in comparison to the two low-hysteresis carbon blacks (C3 and C6) in Table V, which are carbon blacks according to EP 0,315,442. With the lh carbon blacks, a steeper temperature profile of the loss factor could not be observed.

The range of the inversion carbon blacks can be clearly delimited from the conventional carbon blacks. It is above the limiting straight lines represented in FIG. 2, which are obtained from the relation $$\tan \delta_0/\tan \delta_{60} = 2.76 - 6.7 \times 10^{-3} \times \text{CTAB}.$$

Furthermore, for the inversion carbon blacks it is characteristic that, with identical CTAB surface area and similar 24M4-DBP absorption compared to the standard ASTM carbon blacks, the loss factor tan $\delta_{60}$ obtained is lower, and in general the dynamic elongation modulus of the rubber compounds obtained is lower.

It will be seen from Table V that tan $\delta_{60}$ is less than 0.40. It is preferred that tan $\delta_{60}$ is 0.3 or less, more preferably 0.25 or less.

TABLE 5

| Comparison No. | ASTM | CTAB [m²/g] | Iodine [mg/g] | DBP [ml/100 g] | 24M4-DBP [ml/100 g] | tan $\delta_0$ | tan $\delta_{60}$ | tan $\delta_0$/ tan $\delta_{60}$ | \|E*\| (0° C.) [MPa] |
|---|---|---|---|---|---|---|---|---|---|
| C1 | N347 | 84.7 | 89.3 | 121.2 | 98.2 | 0.526 | 0.276 | 1.906 | 35.5 |
| C2 | N347 | 88.3 | 89.2 | 121.2 | 99.8 | 0.511 | 0.270 | 1.893 | 36.4 |
| C3 | 1h-Ruβ | 91.1 | 79.9 | 133.1 | 101.1 | 0.516 | 0.250 | 2.064 | 35.0 |
| C4 | N375 | 94.0 | 89.1 | 111.2 | 98.8 | 0.526 | 0.263 | 2.000 | 35.3 |
| C5 | N375 | 94.6 | 90.8 | 115.2 | 97.0 | 0.533 | 0.272 | 1.960 | 35.2 |
| C6 | 1h-Ruβ | 106.8 | 92.9 | 136.7 | 106.9 | 0.504 | 0.256 | 1.969 | 34.5 |
| C7 | N220 | 106.9 | 118.9 | 114.2 | 97.1 | 0.533 | 0.284 | 1.877 | 40.4 |
| C8 | N220 | 107.9 | 120.9 | 114.3 | 98.7 | 0.522 | 0.291 | 1.794 | 42.7 |
| C9 | N220 | 108.2 | 119.6 | 114.1 | 98.1 | 0.522 | 0.296 | 1.764 | 45.4 |
| C10 | N234 | 117.5 | 120.3 | 123.3 | 100.9 | 0.492 | 0.295 | 1.668 | 50.9 |
| C11 | N234 | 119.0 | 123.1 | 122.2 | 101.4 | 0.509 | 0.296 | 1.720 | 48.3 |
| C12 | N234 | 120.4 | 119.0 | 123.6 | 109.8 | 0.489 | 0.300 | 1.630 | 50.7 |
| C13 | N115 | 128.4 | 157.6 | 113.5 | 97.5 | 0.511 | 0.315 | 1.622 | 50.7 |
| C14 | N115 | 130.1 | 158.2 | 108.4 | 97.2 | 0.518 | 0.300 | 1.727 | 47.4 |
| E1 carbon black examples | | 112.7 | 121.8 | 113.3 | 98.1 | 0.530 | 0.235 | 2.255 | 41.1 |
| B2 | | 111.0 | 112.5 | 117.4 | 100.3 | 0.514 | 0.241 | 2.133 | 44.6 |

1h: low hysteresis

Particle size distribution curves:

For the measurement of the particle size distribution curves, a disk centrifuge BI-DCP with a red light diode from the company Brookhaven was used. This apparatus was developed specifically for the determination of particle size distribution curves for fine particulate solids from extinction measurements, and it was equipped with an automatic measurement and evaluation program for the determination of the particle size distribution.

To carry out the measurements, a dispersion solution was first prepared, consisting of 200 mL of ethanol, 5 drops of ammonia solution and 0.5 g Triton X-100, with demineralized water to bring up the volume to 1000 mL. Furthermore, a spinning solution was prepared, consisting of 0.5 g of Triton X-100, 5 drops of ammonia solution, and the volume is brought up to 1000 mL with demineralized water.

Subsequently, 20 mg of carbon black were mixed with 20 mL of dispersion solution, and suspended in a cooling bath in the solution for 4.5 min with 100-W ultrasound output (80% pulses).

Before beginning the measurements, the centrifuge was operated for 30 min at an rpm of 11,000 $min^{-1}$. 1 mL of ethanol was injected into the rotating disk, and then a bottom layer was carefully applied with 15 mL of spinning liquid. After approximately 1 min, 250 μL of the carbon black suspension were injected, and the measurement program of the apparatus was started; then 50μL of dodecane were coated above the spinning liquid in the centrifuge. Two measurements were determined for each sample measured.

The evaluation of the raw data curve was carried out with the calculation program of the apparatus taking into account a correction for scattered light, and with automatic base line fitting.

Figure 3:
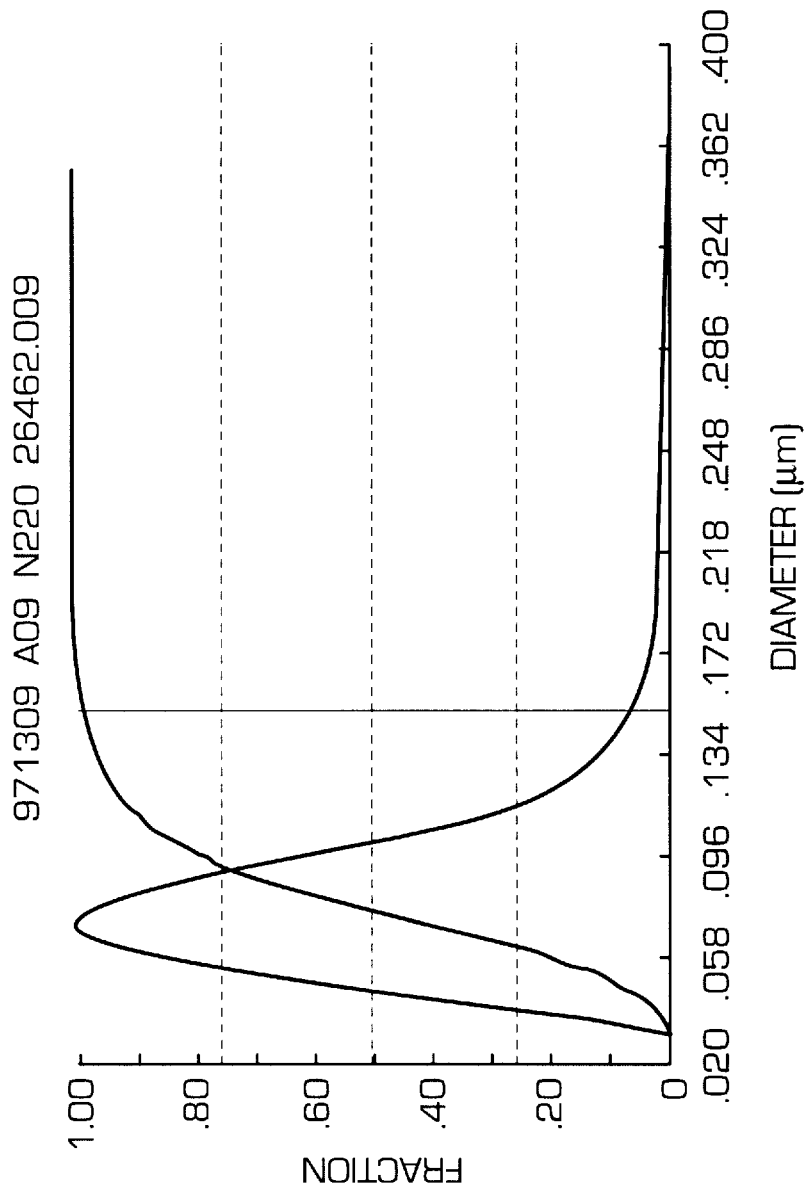
FIG. 3 is a particle size distribution curve of a standard ASTM carbon black N220.
Figure 4:
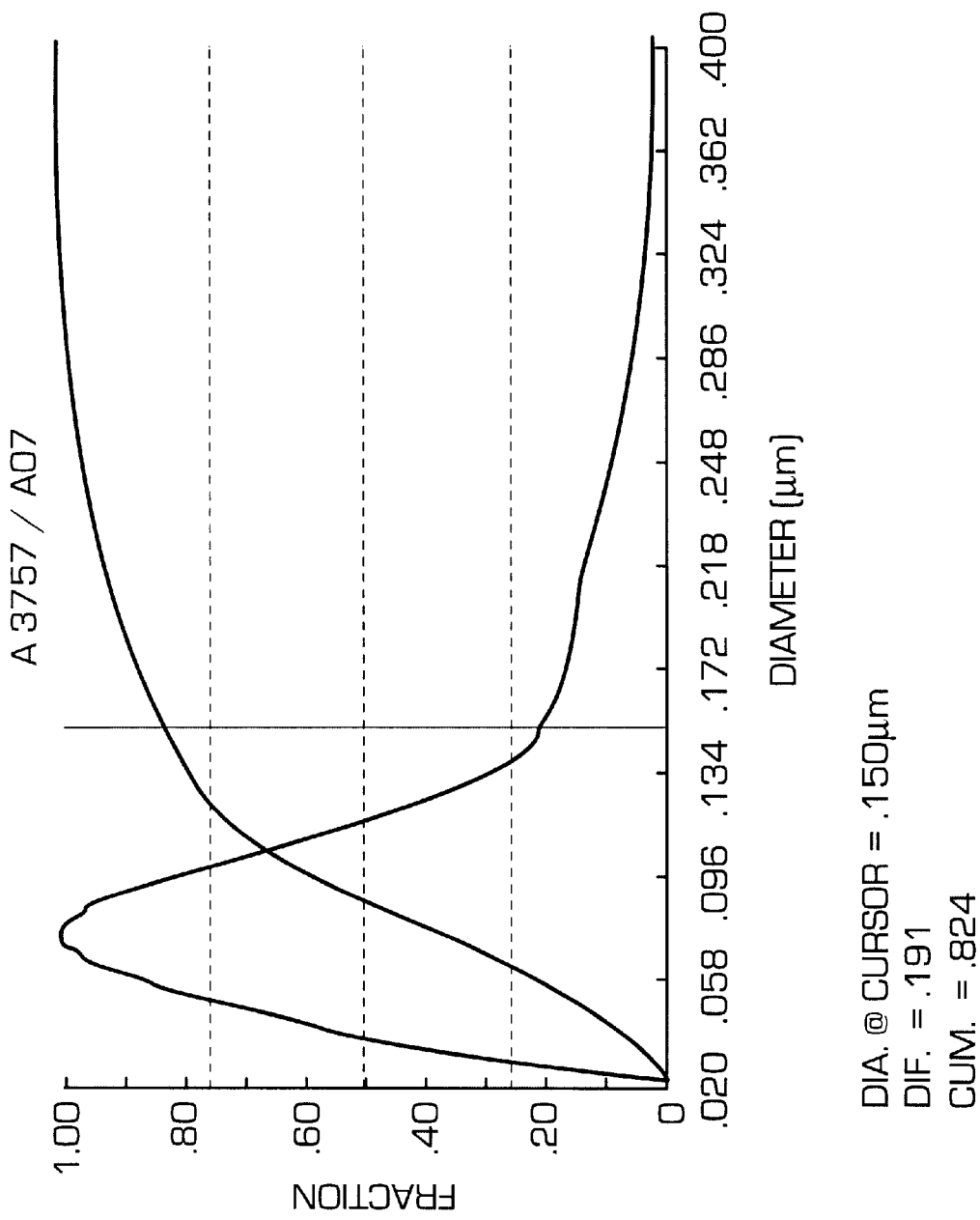
FIG. 4 is a particle size distribution curve of the conventional inversion carbon black of Example 1.
Figure 5:
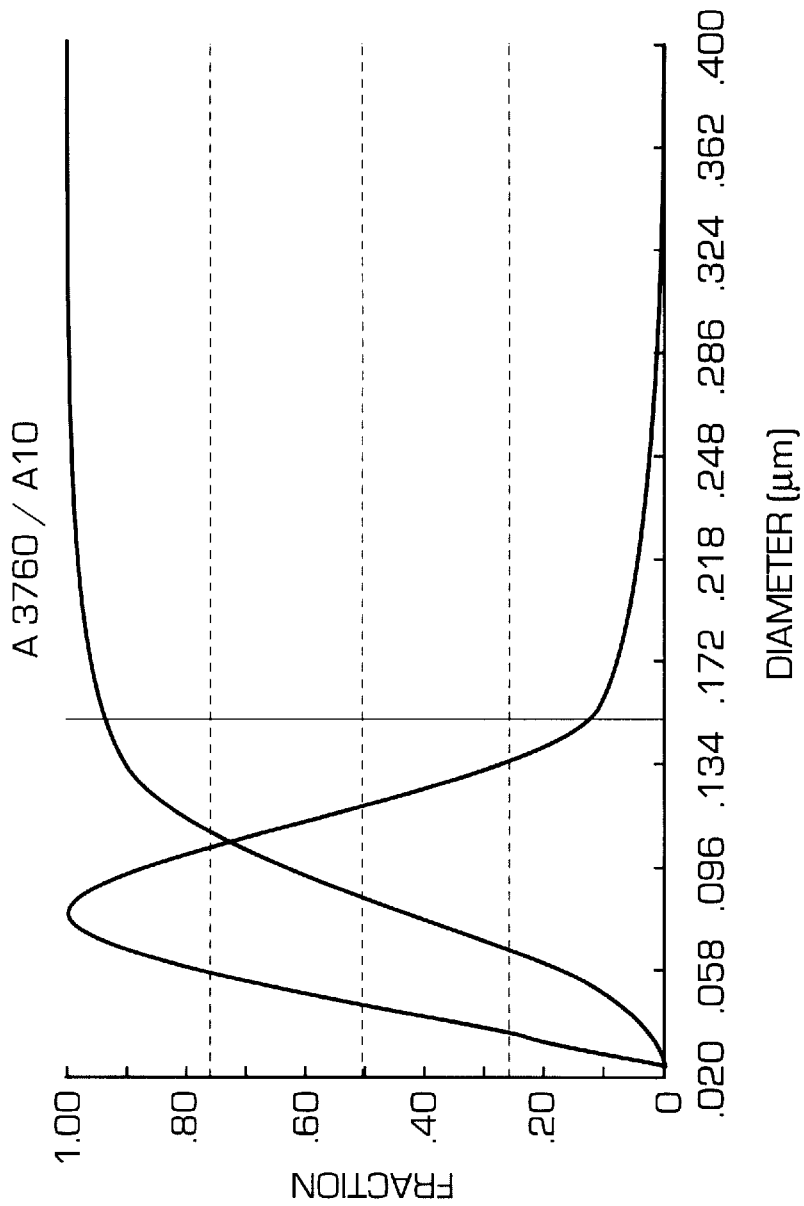
FIG. 5 is a particle size distribution curve of the inversion carbon black according to the invention of Example 2.

FIGS. 3–5 show the particle size distribution curves obtained, from which it is possible to calculate, as described above, the absolute slope of the distribution curves.

FIG. 3 is the distribution curve of the comparison carbon black C9 in Table V, FIG. 4 is the distribution curve of the inversion carbon black of Example 2, and FIG. 5 represents the distribution curve of the inversion carbon black of Example 2 according to the invention. The known inversion carbon black of Example 1 shows a strong asymmetry in the distribution curve, which is specifically caused by a very large proportion of particle sizes above approximately 100 nm. This proportion of carbon black particles strongly decreases with the inversion carbon black according to the invention, which is apparent here in a correspondingly lower absolute slope.

The values determined from such distribution curves for the absolute slope are listed for several standard ASTM carbon blacks and for the two inversion carbon blacks in Table VI. One can see that the standard ASTM carbon blacks present a very low absolute slope, that is, their particle size distribution curves are relatively symmetrical. The known inversion carbon black of Example 1, in contrast, presents a very large absolute slope of more than 400,000 $nm^3$. With the inversion carbon black of Example 2 according to the invention, the absolute slope is still larger than with the standard carbon blacks, but it is lower by approximately one-third of the absolute slope obtained with the known inversion carbon black.

TABLE VI

Absolute slope of the particle size distribution curves of several carbon blacks

| Carbon Black | Surface Area [$m^2/g$] | Absolute slope [$nm^3$] |
| --- | --- | --- |
| N110 | 126.0 | 60448 |
| N115 | 127.7 | 27982 |
| N121 | 119.1 | 18344 |
| N134 | 131.2 | 51882 |
| N220 (C9, Table V) | 108.9 | 25285 |
| N234 | 119.3 | 38568 |
| N326 | 83.0 | 11658 |
| N339 | 89.2 | 22475 |
| N358 | 88.0 | 24854 |
| Example 1 | 112.7 | 439649 |
| Example 1 | 112.7 | 438794 |
| Example 2 | 111 | 133939 |
| Example 2 | 111 | 125985 |

Abrasion Tests:

The abrasion behavior of rubber compounds, which were prepared using the two inversion carbon blacks and the standard carbon blacks N220, were examined using a special abrasion test. This abrasion test allows the evaluation of the abrasion of a rubber compound relative to a reference rubber compound for different loads and speeds.

The abrasion test used is described in detail in the following publications:

K. A. Grosch, the $131^{th}$ ACS Rubber Div. Meeting, No. 7 (1987) and

K. A. Grosch et al., Kautsch. Gummi Kunstst. 50, 841 (1997).

A corresponding test apparatus is commercially available. Therefore, reference is made to the above publications, regarding details of the abrasion test performed with this apparatus.

The rubber compounds used for the abrasion tests were identical to the rubber compounds for the viscoelastic examinations. As reference rubber compound, the rubber compound with the standard carbon black N220 (C9) was used.

Figure 6:
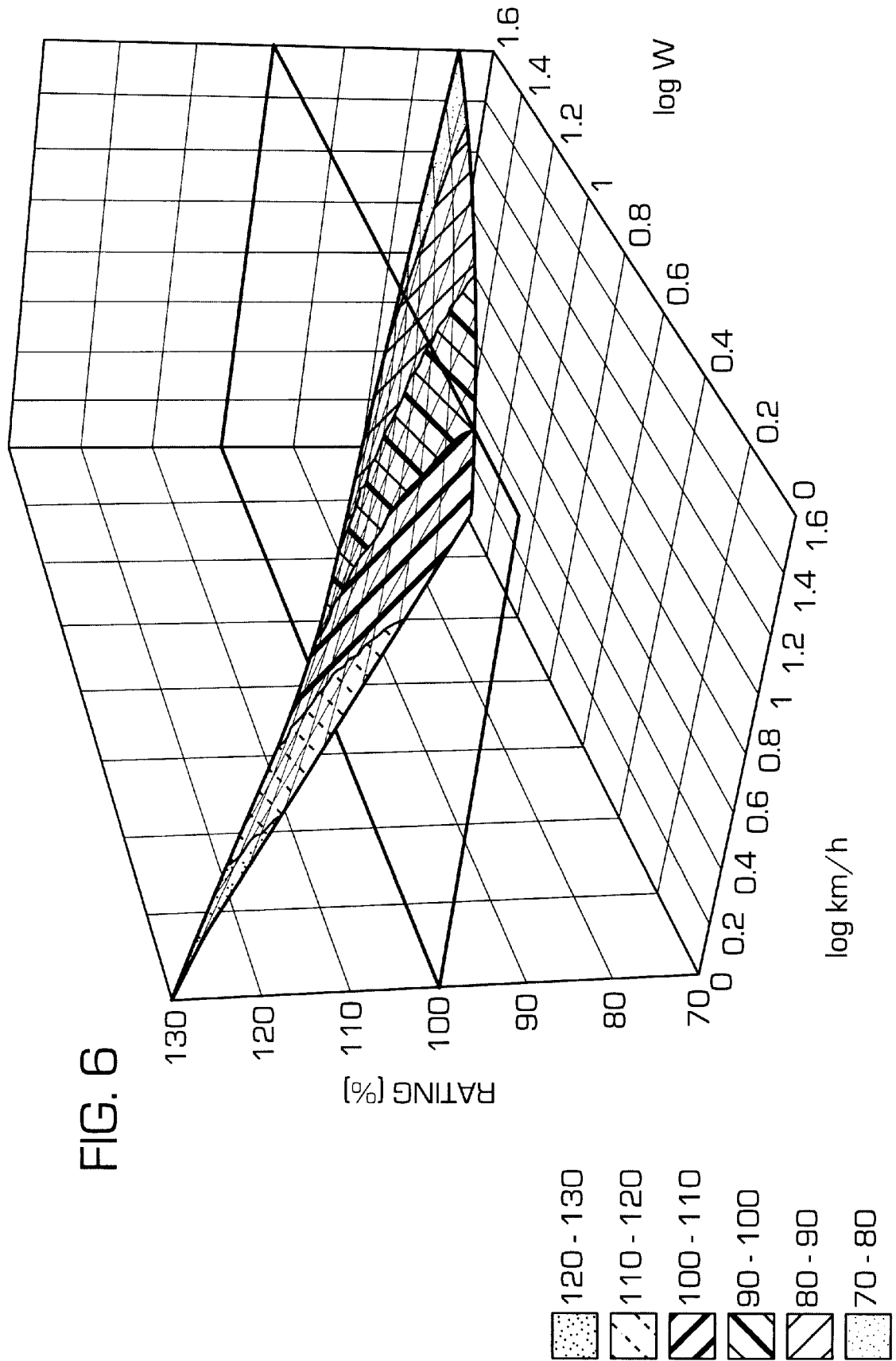
FIG. 6 is a representation of a 3-dimensional graph showing abrasion behavior of a rubber compound using carbon black according to Example 1, compared to a reference rubber compound.
Figure 7:
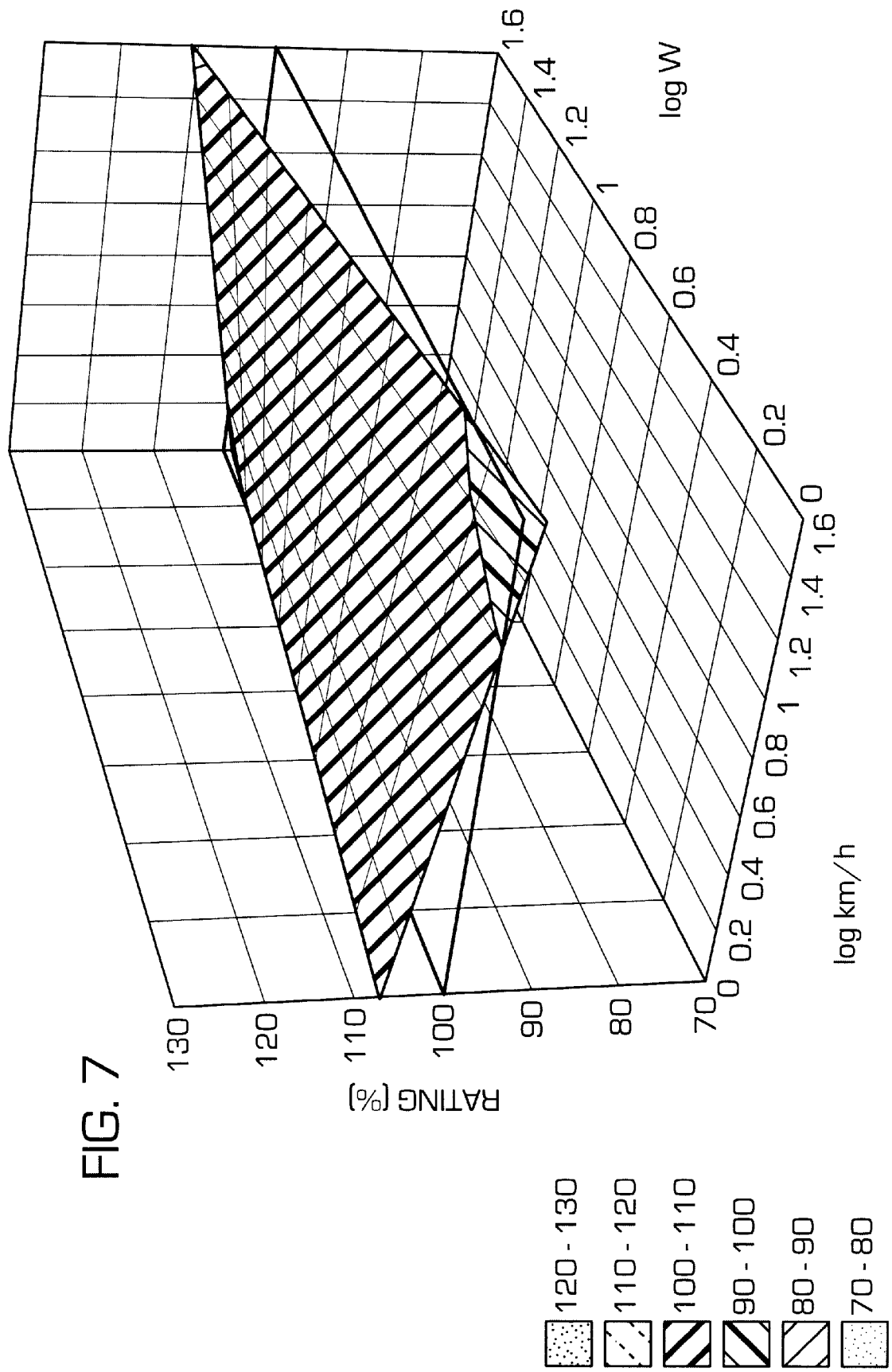
FIG. 7 is a representation of a 3-dimensional graph showing abrasion behavior of a rubber compound using carbon black according to Example 2, compared to a reference rubber compound.

FIGS. 6 and 7 show the obtained results in the three-dimensional diagrams of these figures, the evaluation of the abrasion is plotted versus the reference rubber compound, as a function of the logarithm of the speed and the logarithm of the energy W recorded as a result of the load application to the test body. The abrasion behavior of the reference rubber compound is set equal to 100.

FIG. 6 shows the abrasion behavior of a rubber compound using the inversion carbon black of Example 1. One can see that the rubber compound with the known inversion carbon blacks, in the case of small load application and low speeds has a considerably reduced abrasion compared to the reference rubber compound. However, if the applied loads are high, the abrasion increases compared to the reference rubber compound.

FIG. 7 shows the abrasion behavior of a rubber compound using the inversion carbon black of Example 2 according to the invention in comparison with the reference rubber compound. The rubber compound with the inversion carbon black according to the invention shows a more balanced abrasion behavior than the known inversion carbon black. It is precisely at high speeds and high loads that this rubber compound still presents a 10% improved abrasion behavior. The carbon blacks according to the invention are therefore excellently suited for the manufacture of rubber compounds for tire cap surfaces and adhesive mixtures.

The range values of tan δ and |E*| were measured according to DIN 53513 which is incorporated herein by reference.

Further variations and modifications of the foregoing will be apparent to those skilled in the art and are intended to be encompassed by the claims appended hereto.

German priority application 198 16 025.9 is relied on and incorporated herein by reference.

We claim:

1. Furnace carbon black with a CTAB value of 20–190 $m^2/g$ and 24M4-DBP absorption of 40–140 mL/100 g, with a tan $\delta_0$/tan $\delta_{60}$ ratio which, when incorporated in an SSBR/BR rubber compound, satisfies the relation tan $\delta_0$/tan $\delta_{60}$>2.76–6.7×10$^{-3}$×CTAB, where the value of tan $\delta_{60}$ is always lower than the value for ASTM carbon blacks with identical CTAB surface area and 24M4-DBP absorption, wherein the distribution curve of the particle sizes has an absolute slope of less than 400,000 $nm^3$ wherein the absolute slope AS is determined by the following formula from the measured aggregate size distribution of the carbon black:

$$AS = \frac{\sum_{i=1}^{k} H_i (x_i - \bar{x})^3}{\sum_{i=1}^{k} H_i}$$

wherein $H_i$ denote the frequency at which the particle diameter $x_i$ occurs and $\bar{x}$ is the particle diameter of the aggregate, whose weight corresponds to the average particle weight of the carbon black aggregate and the summation is in the range of 1 to 3000 nm in equidistant spacing for each nanometer.

2. A method for the manufacture of furnace carbon black according to claim 1, in a carbon black reactor which contains, along the reactor axis, a combustion zone, a reaction zone and a termination zone, comprising:

generating a hot waste gas stream in the combustion zone by the combustion of a primary carbon black raw material in an oxygen-containing gas, feeding of the waste gas from the combustion zone through the reaction zone into the termination zone, admixing a second carbon black raw material into the hot waste gas in the reaction zone, and terminating carbon black formation in the termination zone by spraying with water, wherein, as the primary carbon black raw material, oil, an oil/natural gas mixture or natural gas alone are used, and controlling the combustion of the primary carbon black raw material to form nuclei, bringing said nuclei immediately into contact with the secondary carbon black raw material, increasing combustion air, primary and secondary raw material in such a manner that the resulting absolute slope of the particle size distribution curve of the forming carbon black is less than 400,000 $nm^3$.

3. Furnace carbon black made by the process of claim 2.

4. A tire containing of the furnace carbon black according to claim 1.

* * * * *

UNITED STATES PATENT AND TRADEMARK OFFICE
CERTIFICATE OF CORRECTION

PATENT NO. : 6,056,933
DATED : May 2, 2000
INVENTOR(S) : Conny Vogler et al.

It is certified that error appears in the above-indentified patent and that said Letters Patent is hereby corrected as shown below:

On the title page,

In Section [75], the Inventors, line 4, please change "Erfstadt" to --Erftstadt--.

In Section [30], the Foreign Application Priority Data, please change this data as follows:

Change "198 16 025" to --198 16 025.9--; and insert a second priority application as follows:

--Sept. 2, 1998    [DE] Germany.....................198 39 925.1--.

Signed and Sealed this

Twentieth Day of March, 2001

Attest:

NICHOLAS P. GODICI

*Attesting Officer*    *Acting Director of the United States Patent and Trademark Office*